(12) United States Patent
Kishiyama et al.

(10) Patent No.: US 8,270,508 B2
(45) Date of Patent: Sep. 18, 2012

(54) APPARATUS AND METHOD FOR COMMUNICATION IN VARIABLE BANDS

(75) Inventors: Yoshihisa Kishiyama, Yokosuka (JP); Kenichi Higuchi, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 720 days.

(21) Appl. No.: 12/332,856

(22) Filed: Dec. 11, 2008

(65) Prior Publication Data

US 2009/0154584 A1 Jun. 18, 2009

Related U.S. Application Data

(63) Continuation of application No. PCT/JP2007/061932, filed on Jun. 13, 2007.

(30) Foreign Application Priority Data

Jun. 19, 2006 (JP) .................................. 2006-169450

(51) Int. Cl.
  *H04K 1/10* (2006.01)
(52) U.S. Cl. ........ 375/260; 375/146; 375/262; 375/265; 375/267; 375/340; 375/343; 375/346
(58) Field of Classification Search .................. 370/203, 370/204, 205, 206, 207, 208, 209, 210; 375/260, 375/262, 267, 343, 346
See application file for complete search history.

(56) References Cited

U.S. PATENT DOCUMENTS

2003/0224731 A1 12/2003 Yamaura et al.
2006/0203711 A1* 9/2006 Oh et al. ....................... 370/208

FOREIGN PATENT DOCUMENTS

| JP | 2001-313628 A | 11/2001 |
|----|---------------|---------|
| JP | 2003-249908 A | 9/2003 |
| JP | 2005-151481 A | 6/2005 |
| JP | 2006-157421 A | 6/2006 |

OTHER PUBLICATIONS

3GPP TR 25.814 V1.5.0, May 2006, "Physical Layer Aspects for Evolved UTRA," 125 pages.
International Search Report issued in PCT/JP2007/061932, mailed on Sep. 18, 2007, with translation, 5 pages.
Written Opinion issued in PCT/JP2007/061932, mailed on Sep. 18, 2007, 3 pages.
Office Action in Taiwanese Patent Application No. 096121767, dated Sep. 16, 2010, with English translation thereof (7 pages).
Cheong Yui Wong et al., "Multiuser OFDM with adaptive subcarrier, bit, and power allocation", selected Areas in Communications, IEEE Journal on vol. 17, No. 10, Oct. 31, 1999, (12 pages).
Chinese Office Action for Application No. 200780030337.5, mailed on Nov. 2, 2011 (14 pages).

\* cited by examiner

*Primary Examiner* — Dhaval Patel
(74) *Attorney, Agent, or Firm* — Osha Liang LLP (57) ABSTRACT

A transmitter according to the present invention includes a mapping unit configured to convert transmitted data into data pieces associated with individual subcarriers, an inverse Fourier transform unit configured to convert the data pieces into a time-series signal, and a symbol generation unit configured to generate symbols for radio transmission from the time-series signal. The mapping unit associates the transmitted data with subcarriers different from predefined multiple subcarriers arranged at even intervals on a frequency axis. A demapping unit of a receiver according to the present invention supplies data comprising the data pieces associated with the subcarriers different from the predefined multiple subcarriers arranged at even intervals on a frequency axis as the data for restoration.

8 Claims, 6 Drawing Sheets

FIG.1

PRIOR ART

APPARATUS AND METHOD FOR COMMUNICATION IN VARIABLE BANDS

CROSS-REFERENCE TO RELATED APPLICATION

This application is a U.S. continuation application filed under 35 USC 111(a) claiming benefit under 35 USC 120 and 365(c) of PCT application PCT/JP2007/061932 filed on Jun. 13, 2007, which claims priority to Application Ser. No. 2006-169450 filed in Japan on Jun. 19, 2006. The foregoing applications are hereby incorporated herein by reference.

BACKGROUND OF THE INVENTION

1. Field of the Invention

The present invention generally relates to the technical field of mobile communications, and more particularly relates to apparatuses and methods for communication in variable bands.

2. Description of the Related Art

The Orthogonal Frequency Division Multiplexing (OFDM) scheme has various advantages such as high tolerance for multipath transmission channels and high efficiency of frequency utilization. In the OFDM scheme, data is mapped into a large number of subcarriers arranged orthogonally with each other, and inverse Fourier transform is performed on the mapped data pieces to derive a time-series signal and generate transmitted symbols for radio transmission. At the reception side, Fourier transform is performed on the symbols to derive the transmitted data pieces, and the individual data pieces associated with the respective subcarriers are restored to reconstruct the transmitted data.

Figure 1:
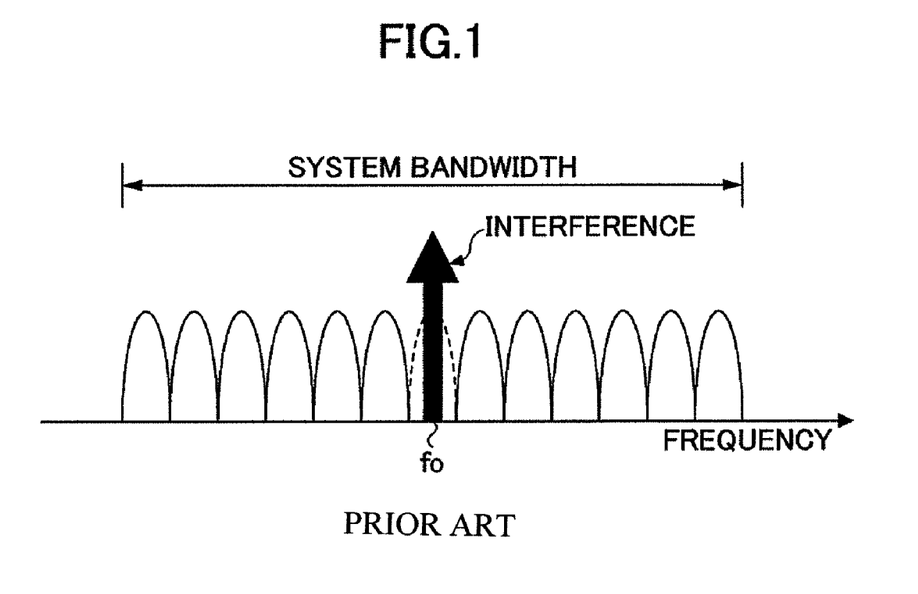
FIG. 1 shows an exemplary communication scheme in accordance with the OFDM scheme.

FIG. 1 shows exemplary signals communicated in the OFDM scheme. Data to be transmitted is mapped into several subcarriers. In this case, one of the subcarriers corresponding to a central frequency $f_0$ is not used for the data mapping and thus is a subcarrier without data. The central frequency corresponds to a carrier frequency, and thus even if data is mapped into it, the data cannot be transmitted with high quality due to a strong interference component caused there. The central frequency may be referred to as "DC subcarrier" or "DC offset".

Meanwhile, in the third and subsequent generation mobile communication systems, it is assumed that user equipment (UE) or user apparatuses use a part or full range of the system band depending on conditions.

Figure 2:
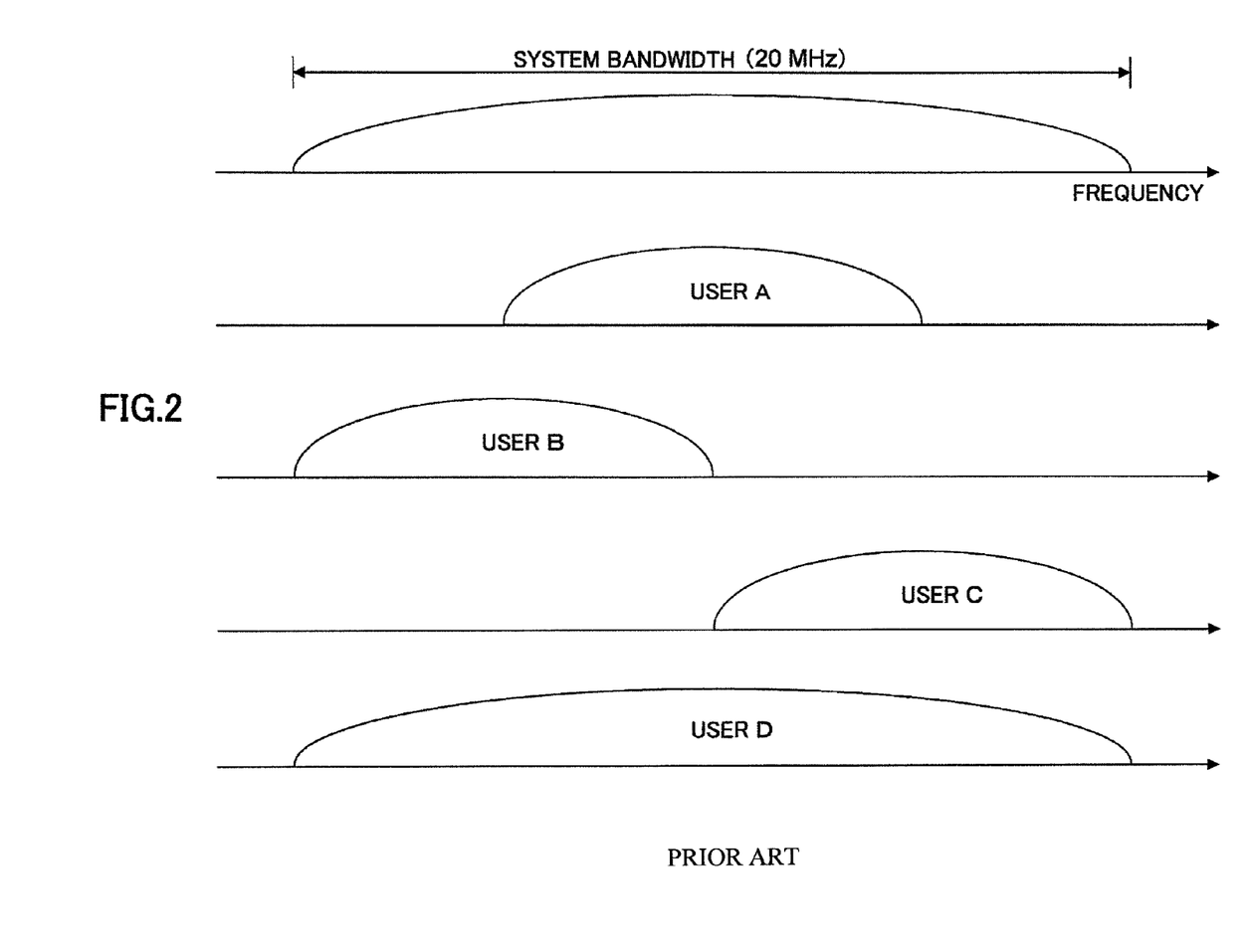
FIG. 2 shows an exemplary communication scheme in various bands.

In an example illustrated in FIG. 2, the whole system bandwidth of 20 MHz is provided, and user apparatuses are allowed to use 10 MHz or 20 MHz for communication. A larger number of system bandwidths may be provided. For example, system bandwidths such as 1.25 MHz or 2.5 MHz may be provided. Utilization efficiency of radio resources may be improved through selection of suitable bands among various bands with greater and smaller bandwidths depending on communication environments and applications. For example, 3GPP TR25.814 V1.5.0 (May 26, 2006) discloses communication systems for communication in variable bands. The communications in variable bands used herein does not mean that user apparatuses are allowed to use the whole frequency in the bands. In fact, one or more of resource blocks included in a variable band assigned to a user apparatus are available for communication.

In the course of fundamental research on the present invention, the inventors had an idea that the communication in variable bands may be achieved in the OFDM scheme. If the idea can be realized, the above-mentioned outstanding advantages of the OFDM scheme, such as high tolerance over multipath interference and high efficiency of frequency utilization, can be applied to the communication in various bands, which may improve transmission efficiency. Also in this case, it must be taken into consideration the central frequency of a band used in communication should not be used for data transmission.

Figure 3:
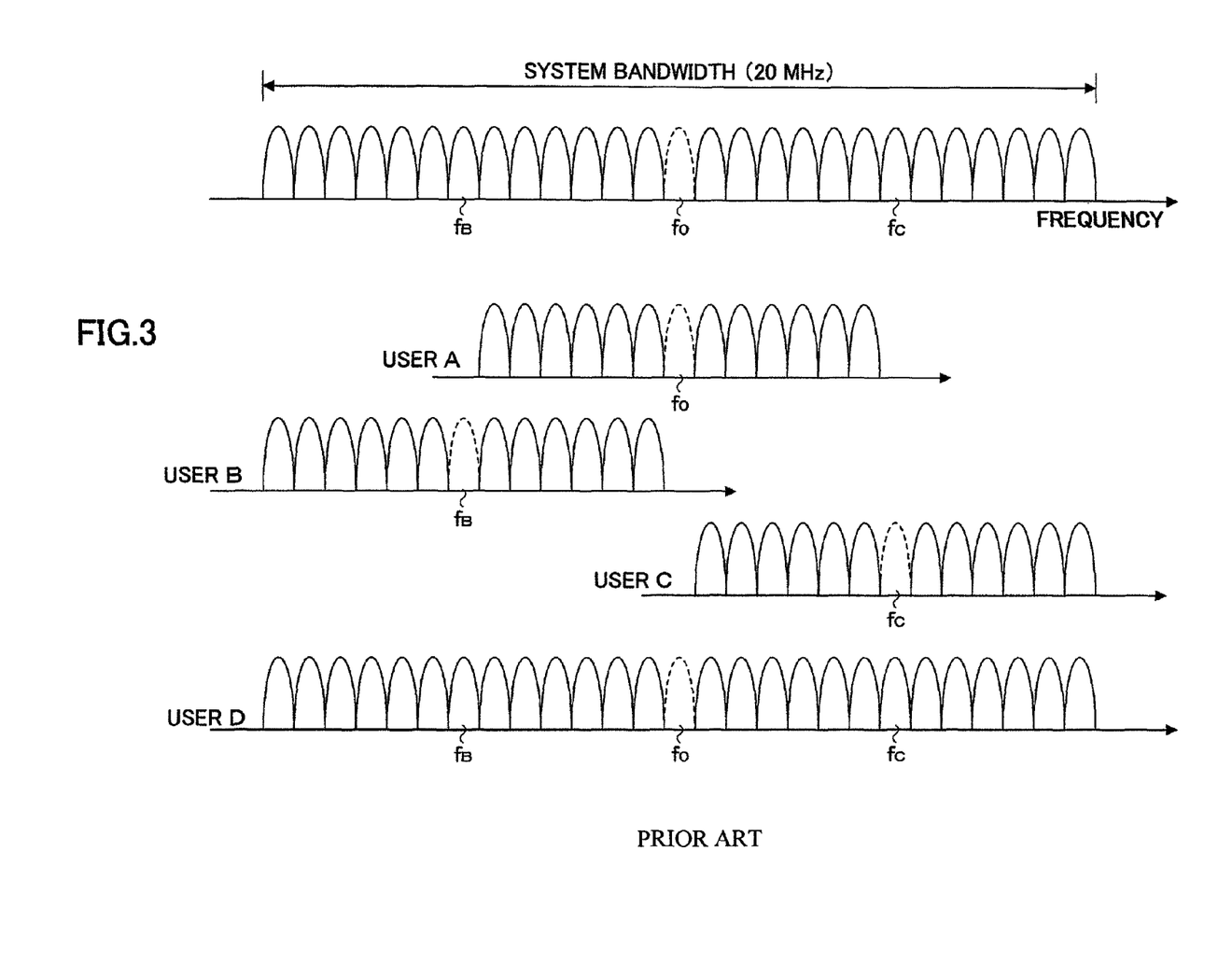
FIG. 3 shows another exemplary communication scheme in various bands.

FIG. 3 shows exemplary communications in variable bands in connection with FIG. 2. In FIG. 3, the relationship between subcarriers and central frequencies is clarified. In the illustration, users A and D communicate with the bandwidths of 10 MHz and 20 MHz, respectively, and the respective central frequencies are the same frequency $f_0$. Thus, data can be transmitted with subcarriers other than the central frequency $f_0$ as is the case of conventional systems in accordance with the OFDM scheme. On the other hand, users B and C use 10 MHz similar to user A but have central frequencies different from user A. For convenience of explanation, the central frequency (DC subcarrier) of a band with 10 MHz for user B is denoted by "$f_B$" while the central frequency of a band with 10 MHz for user C is denoted by "$f_C$". As stated above, no data can be mapped into the frequency $f_B$ in communications with user B. Similarly, no data can be mapped into the frequency $f_C$ in communications with user C. In communications with user D, however, the frequencies $f_B$ and $f_C$ do not correspond to the DC subcarrier and accordingly are available for data transmission. In other words, the frequency $f_B$ or $f_C$ can or cannot be used for the data mapping depending on the bandwidth for user apparatuses. Thus, frequency scheduling has to be performed by determining availability of individual subcarriers for the data mapping, which may not be desirable from the viewpoint of increasing the complexity of controlling base stations.

SUMMARY OF THE INVENTION

One object of the present invention is to transmit signals in various bands in OFDM based communication systems with high quality in a simplified manner.

In order to overcome the above-mentioned problems, an embodiment of the present invention relates to a transmitter for OFDM based communication in a bandwidth selected among multiple bandwidths provided for a system, comprising: a mapping unit configured to convert transmitted data into data pieces associated with individual subcarriers; an inverse Fourier transform unit configured to convert the data pieces into a time-series signal; and a symbol generation unit configured to generate symbols for radio transmission from the time-series signal, wherein the mapping unit associates the transmitted data with subcarriers different from predefined multiple subcarriers arranged at even intervals on a frequency axis.

Another embodiment of the present invention relates to a receiver for OFDM based communication in a bandwidth selected among multiple bandwidths provided for a system, comprising: a Fourier transform unit configured to convert a wirelessly received time-series signal into data pieces in frequency domains; a demapping unit configured to associate the data-pieces with individual subcarriers as data for restoration; and a data restoring unit configured to restore transmitted data from the data for restoration, wherein the demapping unit supplies data comprising the data pieces associated with subcarriers different from predefined multiple subcarriers arranged at even intervals on a frequency axis as the data for restoration.

According to the embodiments of the present invention, signals can be transmitted in various bands in OFDM based communication systems with high quality in a simplified manner.

DETAILED DESCRIPTION OF THE PREFERRED EMBODIMENTS

In one embodiment of the present invention, data to be transmitted is associated with subcarriers different from predetermined multiple subcarriers (null subcarriers) arranged at even intervals on the frequency axis. At the receiver side, the data associated with the subcarriers other than the null subcarriers is processed as restored data. The null subcarriers are not used for communications with any user apparatus. Thus, it is not necessary to determine availability of individual subcarriers for the data mapping, which result in simplified control of a base station and improved quality of data transmission without the use of all user apparatuses.

In order to enable the user apparatuses to communicate in wide and narrow bands in accordance with the OFDM scheme, it is desirable to communicate in a band whose central frequency corresponds to one of predetermined multiple subcarriers. Specifically, an odd number of subcarriers may be provided as the predetermined multiple subcarriers in a system.

The mapping may be performed in accordance with bandwidth information indicative of a relationship between the null subcarriers and variable bandwidths provided in the system. The bandwidth information may be stored in a memory device in advance.

[First Embodiment]

Embodiments of the present invention are described below. Unless specifically indicated, some numerals are simply illustrative and other numerals may be used as needed.

Figure 4:
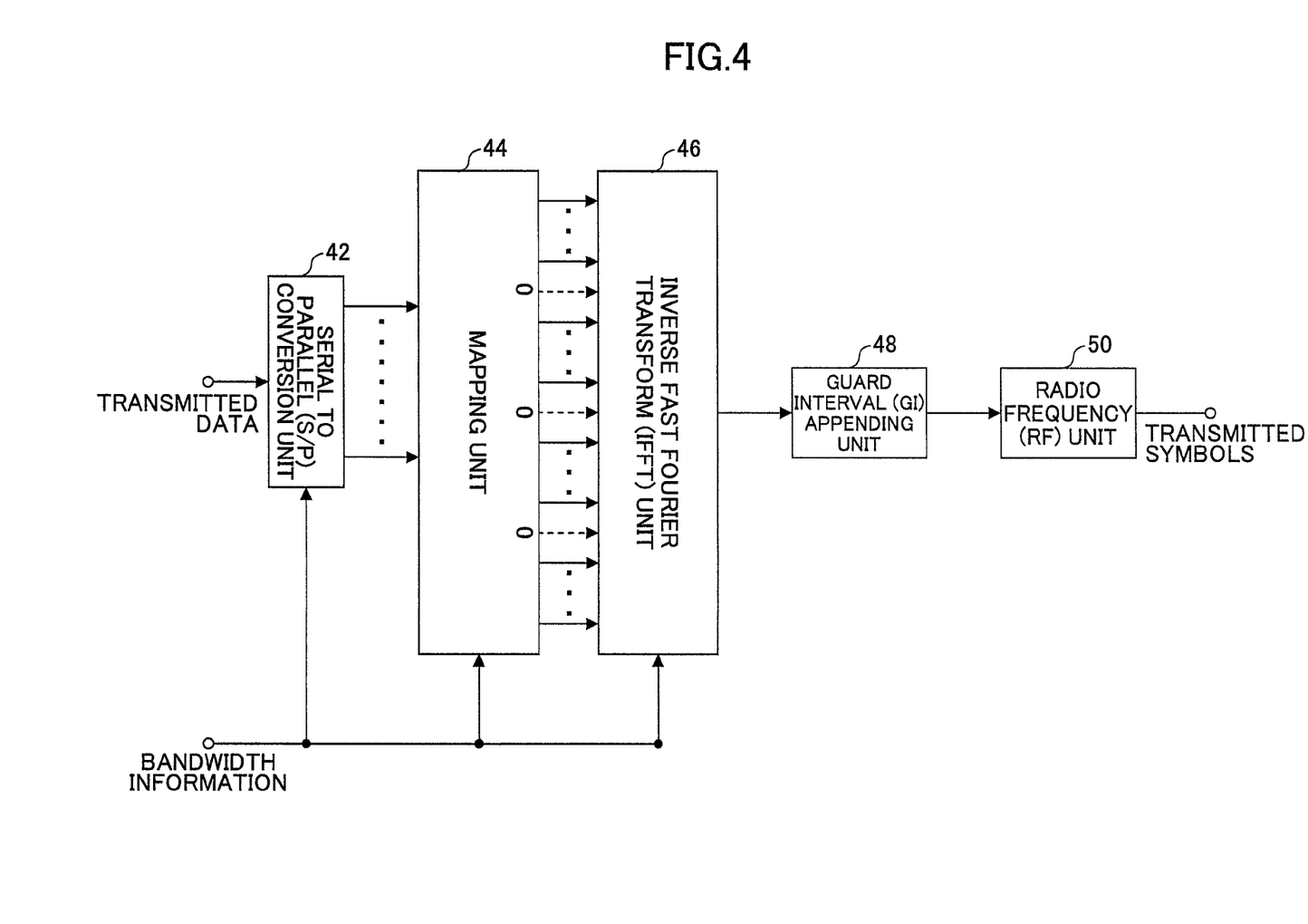
FIG. 4 is a functional block diagram of a transmitter according to one embodiment of the present invention.

FIG. 4 is a functional block diagram of a transmitter according to one embodiment of the present invention. The transmitter may be provided in a base station or a user apparatus. In this embodiment, the transmitter as illustrated in FIG. 4 is provided in both a base station and a user apparatus. In FIG. 4, a serial to parallel (S/P) conversion unit 42, a mapping unit 44, an inverse fast Fourier transform (IFFT) unit 46, a guard interval appending (+GI) unit 48 and a radio frequency (RF) unit 50 are illustrated.

The serial to parallel (S/P) conversion unit 42 serves as a serial to parallel conversion unit for converting a sequence of transmitted data into multiple parallel data sequences. In this embodiment, some operations such as channel encoding and data modulation have been performed on transmitted data.

The mapping unit 44 associates the serial to parallel converted data pieces with individual subcarriers in accordance with bandwidth information. For example, predetermined multiple subcarriers are uniquely associated with individual bandwidths such as 20 MHz, 10 MHz or 5 MHz. These subcarriers are referred to as "null subcarriers" and are not used for data mapping. The bandwidth information indicates which bandwidth is available to the transmitter for communication and which subcarrier is associated with the null subcarrier in the bandwidth.

The mapping unit 44 associates the parallel data pieces with subcarriers other than the null subcarriers. In practice, the mapping is also subject to information indicating which data pieces are multiplexed to which resource blocks in what manner. For clarification, however, detailed descriptions of such multiplexing and scheduling are omitted.

The inverse fast Fourier transform (IFFT) unit 46 performs inverse fast Fourier transform on the data pieces associated with the individual subcarriers for OFDM based modulation.

The guard interval appending (+GI) unit 48 appends a guard interval to the modulated time-series signal.

The radio frequency (RF) unit 50 converts the guard interval appended signal into transmitted symbols for radio transmission from an antenna. The radio frequency unit 50 performs some operations such as band limitation and frequency conversion. In particular, a carrier wave is adapted to the central frequency of a band used by the transmitter. Specifically, if the transmitter is provided in a base station or a user apparatus that uses the whole system band, the carrier wave is set to the central frequency $f_0$ of the system band. On the other hand, if the transmitter is provided in a user apparatus that uses a part of the system band, the carrier wave is set to any null carrier $f_B$, $f_0$ or $f_C$.

Figure 5:
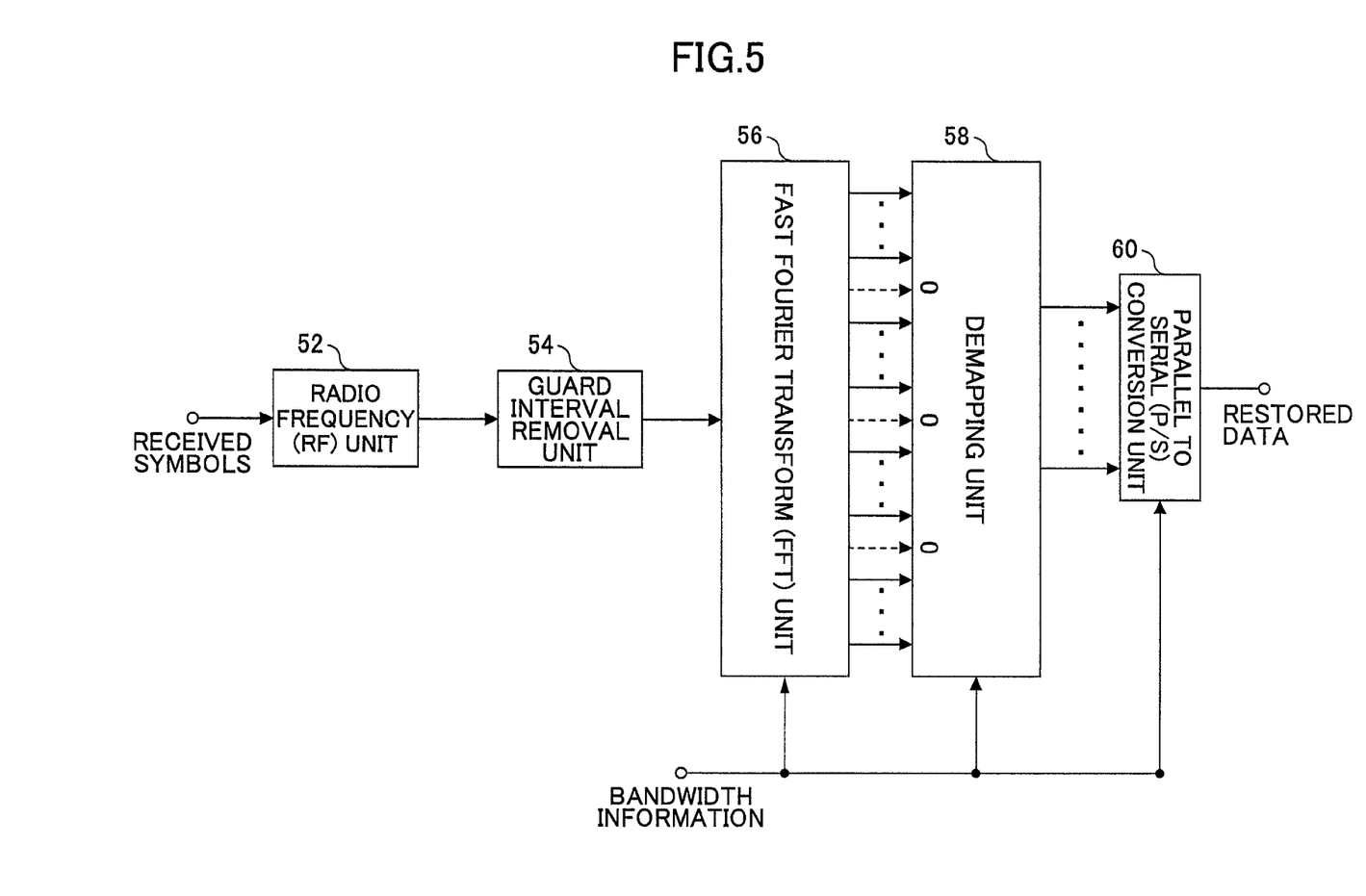
FIG. 5 is a functional block diagram of a receiver according to one embodiment of the present invention.

FIG. 5 is a functional block diagram of a receiver according to one embodiment of the present invention. In FIG. 5, a radio frequency (RF) unit 52, a guard interval removal (−GI) unit 54, a fast Fourier transform (FFT) unit 56, a demapping unit 58 and a parallel to serial conversion (P/S) unit 60 are illustrated.

The radio frequency (RF) unit 52 converts the symbols received via the antenna into a signal for processing in a baseband. The radio frequency unit 52 performs some operations such as band limitation and frequency conversion. In particular, the carrier wave is adapted to the central frequency of a band used by the receiver.

The guard interval removal (−GI) unit 54 removes a portion of the received signal corresponding to a guard interval.

The fast Fourier transform (FFT) unit 56 performs fast Fourier transform on guard interval removed symbols (effective symbols) for OFDM based demodulation. As a result, data pieces mapped into subcarriers can be derived.

The demapping unit 58 extracts and generates data mapped into the subcarriers other than the null subcarrier from the derived data pieces. The null subcarrier can be determined based on the bandwidth information.

The parallel to serial (P/S) conversion unit 60 serves as a parallel to serial conversion unit for converting the (parallel) data pieces mapped into the subcarriers other than the null subcarrier into a data sequence. The converted data is subject to subsequent operations for restoring the transmitted data.

An operation according to one embodiment of the present invention is described with reference to FIGS. 4-6. In operation, transmitted data is supplied to the S/P unit 42 in FIG. 4 for conversion into multiple parallel data pieces, which are supplied to the mapping unit 44. The mapping unit 44 associates the parallel data pieces with subcarriers other than the null subcarrier. No data is mapped into the null subcarrier.

Figure 6:
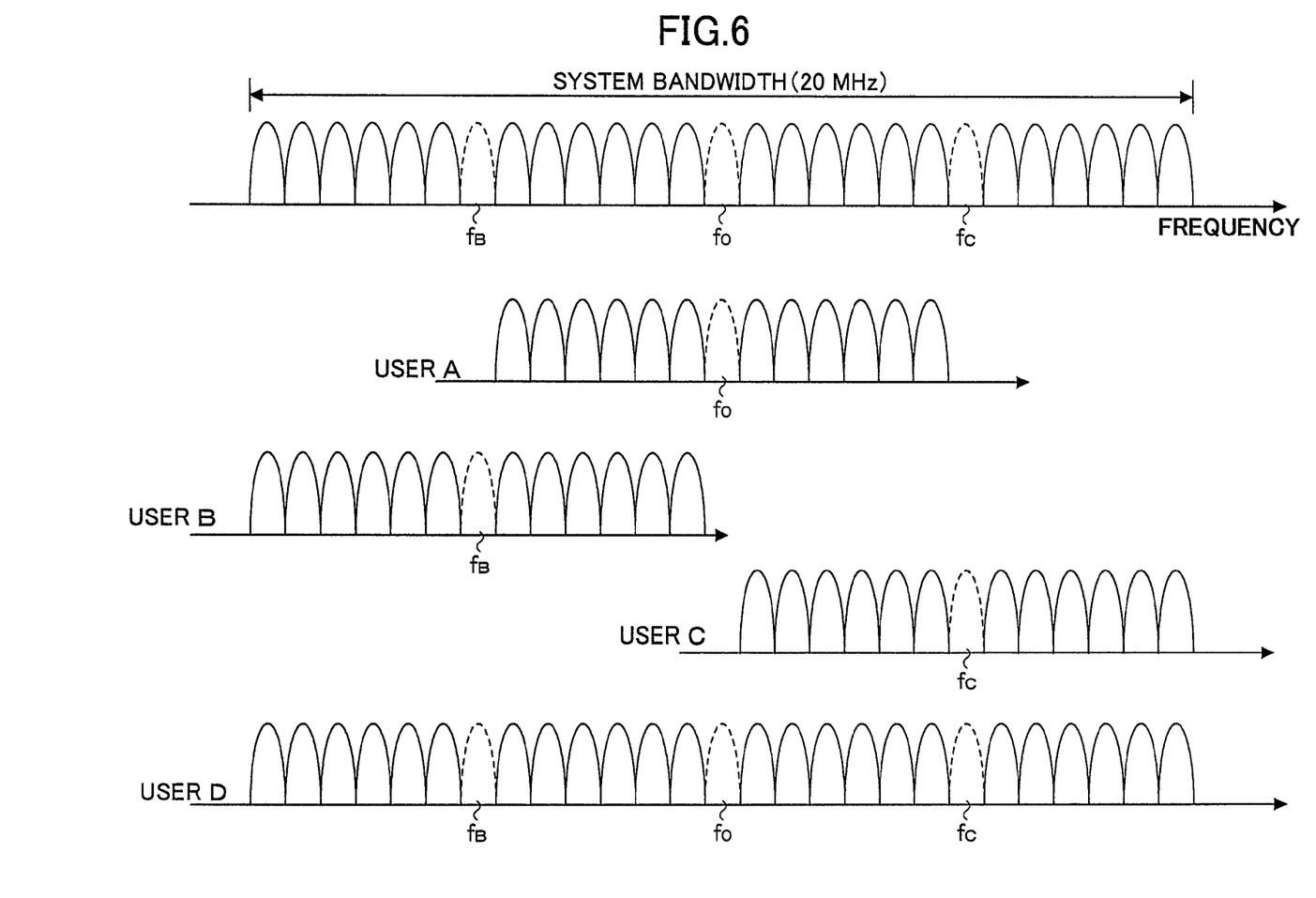
FIG. 6 shows an exemplary operation according to one embodiment of the present invention.

As illustrated in FIG. 6, an odd number of the null subcarriers (three null subcarriers in the lustration) are provided in a single system band. In the system band, the null subcarriers are arranged at even intervals on the frequency axis. In the illustration, one null subcarrier is provided every six subcarriers. The central null subcarrier in the odd number of null subcarriers corresponds to a carrier wave in radio communication by a user apparatus. Thus, the central null subcarrier $f_0$ corresponds to a DC subcarrier for a band in accordance with the conventional OFDM scheme. Typically, information indicating the relationship between a certain subcarrier and a null subcarrier for that subcarrier is fixed in a memory device of the user apparatus and is extracted as bandwidth information as needed.

The preset number of null subcarriers and the interval between the null subcarriers are determined depending on the type of variable bands available to the system. In this embodiment, the interval between the null subcarriers is set to be half of the bandwidth available to any user apparatus, that is, the bandwidth at least guaranteed for any user apparatus, and is equal to 10 MHz in the illustrated case.

The mapping unit 44 in FIG. 4 maps data into subcarriers other than the null subcarriers and supplies the resulting data pieces to the IFFT unit 46. In the mapping unit 44 in FIG. 4, "0"s are illustrated at positions corresponding to the null subcarriers. The three "0"s correspond to $f_B$, $f_0$ and $f_C$ in FIG. 6. The data pieces mapped into the subcarriers other than the null subcarriers are fast Fourier transformed. Then, a guard interval is appended to the transformed signal, and the finally resulting symbols are transmitted from an antenna over the air.

Upon receiving the transmitted symbols, the receiver removes the guard interval and performs Fourier transform on the resulting signal. The demapping unit 58 in FIG. 5 determines the subcarriers other than the null subcarriers for the converted data pieces and extracts the data pieces mapped into the individual subcarriers. Similar to the transmitter side, information indicative of the relationship between the used band and the null subcarriers is derived from the bandwidth information. The individual data pieces are converted by the P/S conversion unit 60 into a signal sequence for restoring the transmitted data subsequently.

According to this embodiment, the null subcarriers preset in the system are not used for communications with any user apparatus. Thus, the availability of individual subcarriers for data mapping does not have to be determined, which can simplify the control of a base station and improve the quality of data transmission without use of the DC subcarrier.

The present invention have been described with reference to the specific embodiments of the present invention, but the embodiments are simply illustrative and variations, modifications, alterations and substitutions could be contrived by those skilled in the art. In the above description, some specific numerical values are used for better understanding of the present invention. Unless specifically indicated, however, these numerical values are simply illustrative and any other suitable values may be used. Separation between embodiments is not essential to the present invention, and two or more embodiments may be used as needed. For convenience of explanation, apparatuses according to the embodiments of the present invention have been described with reference to functional block diagrams, but these apparatuses may be implemented in hardware, software or combinations thereof. The present invention is not limited to the above embodiments, and variations, modifications, alterations and substitutions can be made by those skilled in the art without deviation from the spirit of the present invention.

What is claimed is:

1. A transmitter for OFDM based communication in a bandwidth selected among multiple bandwidths provided for a system, comprising:
    a mapping unit configured to map transmitted data into data pieces associated with individual subcarriers;
    an inverse Fourier transform unit configured to convert the data pieces into a time-series signal; and
    a symbol generation unit configured to generate symbols for radio transmission from the time-series signal,
    wherein the mapping unit assigns a null subcarrier to a center frequency settable to different frequencies in a minimum bandwidth in the multiple bandwidths and assigns the transmitted data to subcarriers different from the null subcarrier;
    wherein the mapping unit assigns multiple null subcarriers in a maximum bandwidth in the multiple bandwidths and assigns the transmitted data to subcarriers different from the multiple null subcarriers; and
    wherein the null subcarrier in the minimum bandwidth corresponds to any of the multiple null subcarriers in the maximum bandwidth.

2. The transmitter as claimed in claim 1, wherein the multiple null subcarriers in the maximum bandwidth comprise three subcarriers or an odd number of subcarriers greater than three.

3. A transmission method for OFDM based communication in a bandwidth selected among multiple bandwidths provided for a system, the method comprising the steps of:
    mapping transmitted data into data pieces associated with individual subcarriers;
    inverse Fourier transforming the data pieces into a time-series signal; and
    generating symbols for radio transmission from the time-series signal,
    wherein the mapping step comprises assigning a null subcarrier to a center frequency settable to different frequencies in a minimum bandwidth in the multiple bandwidths and assigning the transmitted data to subcarriers different from the null subcarrier;
    wherein the mapping step comprises assigning multiple null subcarriers in a maximum bandwidth in the multiple bandwidths and assigning the transmitted data to subcarriers different from the multiple null subcarriers; and
    wherein the null subcarrier in the minimum bandwidth corresponds to any of the multiple null subcarriers in the maximum bandwidth.

4. A receiver for OFDM based communication in a bandwidth selected among multiple bandwidths provided for a system, comprising:
    a Fourier transform unit configured to convert a wirelessly received time-series signal into data pieces in frequency domains;
    a demapping unit configured to associate the data pieces with individual subcarriers as restored data; and
    a data restoring unit configured to restore transmitted data from the restored data,
    wherein the demapping unit supplies data as the restored data, the data being assigned to subcarriers different from a null subcarrier assigned to a center frequency settable to different frequencies in a minimum bandwidth in multiple bandwidths;
    wherein the demapping unit supplies data as the restored data, the data being assigned to subcarriers different from multiple null subcarriers assigned in a maximum bandwidth in the multiple bandwidths; and wherein the null subcarrier in the minimum bandwidth corresponds to any of the multiple null subcarriers in the maximum bandwidth.

5. The receiver as claimed in claim 4, wherein the multiple null subcarriers in the maximum bandwidth comprise three subcarriers or an odd number of subcarriers greater than three.

6. The receiver as claimed in claim 4, wherein the demapping unit associates data in the data pieces with individual subcarriers in accordance with bandwidth information indicative of a relationship between the bandwidths provided for the system and the null subcarriers.

7. A reception method for OFDM based communication in a bandwidth selected among multiple bandwidths provided for a system, the method comprising the steps of:

Fourier transforming a wirelessly received time-series signal into data pieces in frequency domains;

associating the data pieces with individual subcarriers as restored data; and restoring transmitted data from the restored data, wherein the associating step comprises supplying data as the restored data, the data being assigned to subcarriers different from a null subcarrier assigned to a center frequency settable to different frequencies in a minimum bandwidth in multiple bandwidths;

wherein the associating step comprises supplying data as the restored data, the data being assigned to subcarriers different from multiple null subcarriers assigned in a maximum bandwidth in the multiple bandwidths; and wherein the null subcarrier in the minimum bandwidth corresponds to any of the multiple null subcarriers in the maximum bandwidth.

8. The transmitter as claimed in claim 1, wherein the mapping unit associates the transmitted data with subcarriers different from the predefined multiple null subcarriers in accordance with bandwidth information indicative of a relationship between the bandwidths provided for the system and the null subcarriers.

* * * * *